United States Patent
Okura

(10) Patent No.: US 12,221,538 B2
(45) Date of Patent: Feb. 11, 2025

(54) POLY(3-HYDROXYBUTYRATE) RESIN TUBE AND METHOD FOR PRODUCING SAME

(71) Applicant: KANEKA CORPORATION, Osaka (JP)

(72) Inventor: Tetsuo Okura, Settsu (JP)

(73) Assignee: KANEKA CORPORATION, Osaka (JP)

( * ) Notice: Subject to any disclaimer, the term of this patent is extended or adjusted under 35 U.S.C. 154(b) by 878 days.

(21) Appl. No.: 17/266,676

(22) PCT Filed: Aug. 19, 2019

(86) PCT No.: PCT/JP2019/032298
§ 371 (c)(1),
(2) Date: Feb. 8, 2021

(87) PCT Pub. No.: WO2020/040093
PCT Pub. Date: Feb. 27, 2020

(65) Prior Publication Data
US 2021/0301127 A1    Sep. 30, 2021

(30) Foreign Application Priority Data
Aug. 20, 2018  (JP) .................. 2018-154019

(51) Int. Cl.
| | |
|---|---|
| *B29C 48/32* | (2019.01) |
| *B29C 48/88* | (2019.01) |
| *C08G 63/78* | (2006.01) |
| *C08L 67/04* | (2006.01) |

(52) U.S. Cl.
CPC .............. *C08L 67/04* (2013.01); *B29C 48/32* (2019.02); *B29C 48/912* (2019.02); *C08G 63/78* (2013.01); *B29K 2867/04* (2013.01)

(58) Field of Classification Search
CPC .... B29C 48/32; B29C 48/912; B29K 2867/04
USPC ..................................................... 264/177.1
See application file for complete search history.

(56) References Cited

U.S. PATENT DOCUMENTS

| | | |
|---|---|---|
| 2003/0217648 A1 | 11/2003 | Noda et al. |
| 2016/0090466 A1 | 3/2016 | Koyama et al. |

FOREIGN PATENT DOCUMENTS

| | | | |
|---|---|---|---|
| EP | 3 778 771 A1 | 2/2021 | |
| JP | 2003-518998 A | 6/2003 | |
| JP | 2004-331757 A | 11/2004 | |
| JP | 2004-331913 A | 11/2004 | |
| JP | 2005-350530 A | 12/2005 | |
| JP | 2006-136657 A | 6/2006 | |
| WO | WO-0149770 A1 * | 7/2001 | ............. A47G 21/00 |
| WO | WO 2014/188646 A1 | 11/2014 | |

OTHER PUBLICATIONS

International Search Report issued on Nov. 5, 2019 in PCT/JP2019/032298 filed on Aug. 19, 2019, 2 pages.
Kershaw, "Biodegradable Plastics & Marine Litter. Misconceptions, Concerns and Impacts on Marine Environments", United Nations Environment Programme (UNEP), 2015, pp. 1-33 (38 total pages).

* cited by examiner

*Primary Examiner* — Jeffrey M Wollschlager
*Assistant Examiner* — Xue H Liu
(74) *Attorney, Agent, or Firm* — Oblon, McClelland, Maier & Neustadt, L.L.P.

(57) ABSTRACT

Provided is a poly(3-hydroxybutyrate) resin tube including a poly(3-hydroxybutyrate) resin, the tube having a wall thickness of 0.1 to 0.6 mm. The difference between the melting point peak temperature and the melting point peak end temperature in differential scanning calorimetry analysis of the poly(3-hydroxybutyrate) resin is preferably 10° C. or higher. Preferably, production of the tube includes the step of melting a poly(3-hydroxybutyrate) resin in an extruder, then extruding the resin from an annular die, and introducing the resin into water, the annular die temperature being set to a temperature between the melting point peak temperature and the melting point peak end temperature in differential scanning calorimetry analysis of the poly(3-hydroxybutyrate) resin.

7 Claims, No Drawings

POLY(3-HYDROXYBUTYRATE) RESIN TUBE AND METHOD FOR PRODUCING SAME

TECHNICAL FIELD

The present invention relates to a poly(3-hydroxybutyrate) resin tube and a method for producing the tube.

BACKGROUND ART

In recent years, separate collection and composting of food waste have been promoted mainly in European nations, and plastic products that can be composted together with food waste have been desired. As an example of the plastic products, Patent Literature 1 discloses a tubular molded product such as a straw, which includes, for example, polylactic acid and aliphatic polyester and/or aliphatic-aromatic polyester.

On the other hand, environmental problems caused by waste plastic have gained prominent attention, and in particular, it has become apparent that a large amount of plastic flowing into the sea due to ocean dumping or through rivers are drifting in the ocean on a global scale. Such plastic maintains its shape for a long period of time, and is therefore pointed out as having an impact on the ecosystem, such as so-called ghost fishing in which marine organisms are restrained and captured, or a situation in which when ingested by marine organisms, the plastic remains in the digestive organ and causes eating disorders.

Further, the problem is pointed out that microplastic generated due to disintegration and micronization of plastic by ultraviolet rays adsorbs harmful compounds in seawater, and when marine organisms ingest the microplastic, harmful substances are taken into the food chain.

Against marine pollution caused by such plastic, use of biodegradable plastic is expected, but the report (Non-Patent Literature 1) compiled by the United Nations Environmental Programme in 2015 points out that plastic biodegradable in the compost, such as polylactic acid, cannot be a countermeasure against marine pollution because such plastic cannot be expected to de degraded in a short period of time in the realistic ocean with a low temperature.

Recently, the impact of drifting waste straws on the ecosystem has been pointed out, and the continuous use of straws has been discussed in beverage manufacturers and the like. However, straws are not only fashionable but also effective for suction of beverages in which solid matter precipitates and beverages with high viscosity, and are thus desired to be continuously used rather than being totally prohibited.

Under these circumstances, poly(3-hydroxybutyrate) resins are attracting attention as materials capable of solving the above-described problems because the resins are materials which can undergo biodegradation even in seawater.

Patent Literature 2 discloses production of a biodegradable resin composition by melting and kneading a material containing poly(3-hydroxybutyrate-co-3-hydroxyhexanoate), and suggests a tube as an example of a molded product thereof, but does not present a view of applicability as a straw and degradability in seawater.

For the tube to be used as a straw, the tube is required to have a property of being flexible so that the tube is hardly broken even when bitten at an end part, and one is unlikely to be injured when drinking a beverage, from the viewpoint of securing safety.

CITATIONS LIST

Patent Literatures

PTL 1: Japanese Patent Laid-Open Publication No. 2005-350530
PTL 2: Japanese Patent Laid-Open Publication No. 2004-331913

Non-Patent Literature

NPL 1: United Nations Environment Programme 2015, BIODEGRADABLE PLASTICS & MARINE LITTER

SUMMARY OF INVENTION

Technical Problem

Accordingly, an object of the present invention is to provide a tube which is flexible, can be suitably used as a straw, and can be rapidly degraded even in seawater.

Solution to Problem

The present inventors have extensively conducted studies for solving the above-described problems, and resultantly found that a tube including a poly(3-hydroxybutyrate) resin and having a specific wall thickness is flexible, can be suitably used as a straw, and can be rapidly degraded even in seawater, leading to completion of the present invention.

That is, the present invention relates to a poly(3-hydroxybutyrate) resin tube including a poly(3-hydroxybutyrate) resin, the tube having a wall thickness of 0.1 to 0.6 mm. The difference between the melting point peak temperature and the melting point peak end temperature in differential scanning calorimetry analysis of the poly(3-hydroxybutyrate) resin is preferably 10° C. or higher. The poly(3-hydroxybutyrate) resin is preferably poly(3-hydroxybutyrate-co-3-hydroxyhexanoate).

The present invention also relates to a method for producing the poly(3-hydroxybutyrate) resin tube, the method including the step of melting a poly(3-hydroxybutyrate) resin in an extruder, then extruding the resin from an annular die, and introducing the resin into water, the annular die temperature being set to a temperature between the melting point peak temperature and the melting point peak end temperature in differential scanning calorimetry analysis of the poly(3-hydroxybutyrate) resin. The melt viscosity of the poly(3-hydroxybutyrate) resin at 160° C. is preferably 10,000 poise or more. Preferably, the production method further includes the step of mixing at least two types of poly(3-hydroxybutyrate) resins.

Advantageous Effects of Invention

According to the present invention, it is possible to provide a tube which is flexible, can be suitably used as a straw, and can be rapidly degraded even in seawater.

DESCRIPTION OF EMBODIMENTS

Hereinafter, embodiments of the present invention will be explained, but the present invention is not limited to the following embodiments.

The poly(3-hydroxybutyrate) resin in the present invention is an aliphatic polyester resin which can be produced from microorganisms, and the polyester resin has 3-hydroxybutyrate as a repeating unit. The poly(3-hydroxybutyrate) resin may be poly(3-hydroxybutyrate) having only 3-hydroxybutyrate as a repeating unit, or may be a copolymer of 3-hydroxybutyrate and other hydroxyalkanoates. The poly(3-hydroxybutyrate) resin may be a mixture of the homopolymer and one or more copolymers, or a mixture of two or more copolymers.

Specific examples of the poly(3-hydroxybutyrate) resin include poly(3-hydroxybutyrate), poly(3-hydroxybutyrate-co-3-hydroxyhexanoate), poly(3-hydroxybutyrate-co-3-hydroxyvalerate), poly(3-hydroxybutyrate-co-4-hydroxybutyrate), poly(3-hydroxybutyrate-co-3-hydroxyoctanoate), and poly(3-hydroxybutyrate-co-3-hydroxyoctadecanoate). Of these, poly(3-hydroxybutyrate), poly(3-hydroxybutyrate-co-3-hydroxyhexanoate), poly(3-hydroxybutyrate-co-3-hydroxyvalerate) and poly(3-hydroxybutyrate-co-4-hydroxybutyrate) are preferable because of easy industrial production.

Further, poly(3-hydroxybutyrate-co-3-hydroxyhexanoate) is preferable because by changing the composition ratio of the repeating unit, the melting point and the crystallinity degree can be changed, so that physical properties such as the Young's modulus and the heat resistance can be changed, and it is possible to impart physical properties intermediate between polypropylene and polyethylene and because of easy industrial production and being useful in terms of physical properties as described above. In particular, among poly(3-hydroxybutyrate) resins having a property of being easily thermally degraded under heating at 180° C. or higher, poly(3-hydroxybutyrate-co-3-hydroxyhexanoate) is preferable from the viewpoint of enabling reduction of the melting point, so that molding at a low temperature is possible.

From the viewpoint of a balance between flexibility and strength, the composition ratio of repeating units of the poly(3-hydroxybutyrate-co-3-hydroxyhexanoate) is preferably 80/20 to 99/1 (mol/mol), more preferably 75/15 to 97/3 (mol/mol), in terms of the composition ratio of 3-hydroxybutyrate units to 3-hydroxyhexanoate units. This is because the above-mentioned composition ratio is preferably 99/1 or less from the viewpoint of flexibility, and preferably 80/20 or more from the viewpoint of ensuring that the resin has a moderate hardness.

Examples of commercialized products of poly(3-hydroxybutyrate-co-3-hydroxyhexanoate) include "Kaneka Biodegradable Polymer PHBH" (registered trademark) from Kaneka Corporation.

The melting point, Young's modulus and the like of the poly(3-hydroxybutyrate-co-3-hydroxyvalerate) vary depending on the ratio of the 3-hydroxybutyrate component and the 3-hydroxyvalerate component. Since both the components are co-crystallized, the crystallinity degree is as high as 50% or more, and brittleness is not sufficiently improved although the poly(3-hydroxybutyrate-co-3-hydroxyvalerate) is more flexible than poly(3-hydroxybutyrate).

For straws that are for sale to the general public, tubes may be subjected to secondary processing such as processing for forming a stopper portion for making an extensible straw by connecting a plurality of tubes having different diameters, or processing for forming a bellows portion which enables bending of a tube in the middle. Such secondary processing is performed by heating and plasticizing a predetermined portion of the tube, and then molding the tube, and it is desirable that the overall shape of the tube be maintained even during the plasticization. However, a poly(3-hydroxybutyrate) resin generally has a property of hardly maintaining its shape when heated and plasticized, and both maintenance of the shape by heating and moldability are difficult to achieve, leading to poor secondary-processability.

For imparting excellent secondary-processability, in the present invention, the poly(3-hydroxybutyrate) resin used is preferably a poly(3-hydroxybutyrate) resin in which the difference between the melting point peak temperature and the melting point peak end temperature in differential scanning calorimetry analysis is 10° C. or higher. This is because when the temperature difference is 10° C. or higher, some crystals are easily made to remain without being melted while the poly(3-hydroxybutyrate) resin is melted. This enables maintenance of the overall shape of the tube while heating and plasticizing a predetermined portion of the tube in secondary processing of the tube, so that molding of the tube can be easily performed by secondary processing. That is, both maintenance of the shape by heating and moldability can be achieved, so that it is possible to achieve excellent secondary-processability.

Thus, the straw can be easily given a bent portion or an extensible structure, and a straw with high convenience can be provided.

In addition to the excellent secondary-processability described above, there is the advantage that in molding of a tube by melt extrusion as described later, solidification of the poly(3-hydroxybutyrate) resin in water after extrusion is quickened to easily avoid flattening of the tube under hydraulic pressure.

The temperature difference is more preferably 12° C. or higher, still more preferably 15° C. or higher, even more preferably 18° C. or higher. The upper limit of the temperature difference is not particularly limited, and is preferably 50° C. or lower, more preferably 40° C.' or lower, still more preferably 35° C. or lower, even more preferably 30° C. or lower, from the viewpoint of ease of production of the poly(3-hydroxybutyrate) resin.

In the present invention, the melting point peak temperature and the melting point peak end temperature in differential scanning calorimetry analysis are defined as follows. In an endothermic curve obtained when an aluminum pan is filled with 4 to 10 mg of a resin sample, and using a differential scanning calorimeter, the resin sample is melted by elevating the temperature at a speed of 10° C./min from 30° C. to 180° C. under nitrogen flow, the temperature at which the amount of absorption of heat is maximum is defined as a melting point peak temperature, and the temperature at which the melting point peak ends and absorption of heat does not occur is defined as a melting point peak end temperature. The melting point peak temperature and the melting point peak end temperature are measured for the entire poly(3-hydroxybutyrate) resin contained in the poly (3-hydroxybutyrate) resin tube.

As the poly(3-hydroxybutyrate) resin in which the difference between the melting point peak temperature and the melting point peak end temperature is 10° C. or higher, a poly(3-hydroxybutyrate) resin having a broad melting point peak and containing a high-melting-point component can be used. A poly(3-hydroxybutyrate) resin having a broad melting point peak and containing a high-melting-point component can be used in combination with another poly(3-hydroxybutyrate) resin having a different melting point property.

Specific examples of the method for producing the poly (3-hydroxybutyrate) resin having a broad melting point peak and containing a high-melting-point component include a method in which at least two types of poly(3-hydroxybutyrate) resins having different melting point behaviors are simultaneously produced in a single microorganism to obtain the poly(3-hydroxybutyrate) resin as a mixed resin as described in International Publication No. WO 2015/146194.

Preferably, the method for producing a poly(3-hydroxybutyrate) resin having a broad melting point peak and containing a high-melting-point component further includes the step of mixing at least two types of poly(3-hydroxybutyrate) resins. By mixing a plurality of poly(3-hydroxybutyrate) resins having different melting point behaviors, the melting point peak of the poly(3-hydroxybutyrate) resin is further broadened, and as a result, further excellent secondary-processability can be imparted to the resulting tube.

In the step of mixing the two types of poly(3-hydroxybutyrate) resins, it is preferable to melt and knead the two types of resins for achieving a uniform resin composition. The heating temperature during melting and kneading can be appropriately set as long as the poly(3-hydroxybutyrate) resin can be melted and kneaded, and it is preferable that the heating temperature be set to a temperature between the melting point peak temperature and the melting point peak end temperature of the poly(3-hydroxybutyrate) resin as a whole. When such a condition is employed, some of crystals remain in the molten resin, so that the melting point peak of the poly(3-hydroxybutyrate) resin is further broadened and the melt viscosity of the poly(3-hydroxybutyrate) resin can be increased.

The poly(3-hydroxybutyrate) resin tube of the present invention may contain resins other than the poly(3-hydroxybutyrate) resin as long as the effects of the present invention are not impaired. Examples of such other resins include aliphatic polyester resins such as polybutylene succinate adipate, polybutylene succinate, polycaprolactone and polylactic acid, and aliphatic-aromatic polyester-based resins such as polybutylene adipate terephthalate, polybutylene sebacate terephthalate and polybutylene azelate terephthalate. As the other resins, only one resin may be contained, or two or more resins may be contained.

The content of the other resins is not particularly limited, and is preferably 30 parts by weight or less, more preferably 20 parts by weight or less, based on 100 parts by weight of the poly(3-hydroxybutyrate) resin. The lower limit of the content of the other resins is not particularly limited, and may be 0 parts by weight.

The poly(3-hydroxybutyrate) resin tube of the present invention may contain additives which can be used together with the poly(3-hydroxybutyrate) resin as long as the effects of the present invention are not hindered. Examples of such additives include inorganic fillers, colorants such as pigments and dyes, odor absorbers such as activated charcoal and zeolite, fragrances such as vanillin and dextrin, plasticizers, oxidation inhibitors, antioxidants, weather resistance improvers, ultraviolet absorbers, crystal nucleating agents, lubricants, mold release agents, water repellants, antibacterial agents and slidability improvers. Only one additive may be contained. Two or more additives may be included. The content of these additives can be appropriately set by those skilled in the art according to the use purpose thereof.

In the present invention, the tube refers to a long and thin cylindrical molded product which has a substantially constant wall thickness, and is composed of a wall surface having a substantially circular cross-sectional shape, and hollowed inside. The wall thickness of the poly(3-hydroxybutyrate) resin tube of the present invention is preferably 0.1 to 0.6 mm, more preferably 0.2 to 0.4 mm for ensuring that the tube is not collapsed by suction when used as a straw to drink a beverage, the tube is hardly broken because of its moderate flexibility, the tube is unlikely to cause injury when sticking the fingertip, and the tube is rapidly degraded even in seawater.

The outer diameter of the poly(3-hydroxybutyrate) resin tube of the present invention is not particularly limited, and is preferably 2 to 10 mm, more preferably 4 to 8 mm, still more preferably 5 to 7 mm from the viewpoint of ease of use when the tube is used as a straw to drink a beverage.

The cross-sectional shape of the poly(3-hydroxybutyrate) resin tube of the present invention is substantially circular, and is preferably as close as possible to a perfect circle from the viewpoint of usability as a straw. Thus, the flatness of the cross-sectional shape of the tube [100×(maximum outer diameter value-minimum outer diameter value)/maximum outer diameter value] is preferably 10% or less, more preferably 8% or less, still more preferably 5% or less, even more preferably 3% or less. The cross-sectional shape is a perfect circle when the flatness is 0%.

The length of the poly(3-hydroxybutyrate) resin tube of the present invention is not particularly limited, and is preferably 50 to 350 mm, more preferably 70 to 300 mm, still more preferably 90 to 270 mm from the viewpoint of ease of use when the tube is used as a straw to drink a beverage.

The poly(3-hydroxybutyrate) resin tube of the present invention can be suitably used as a straw.

The tube of the present invention, which is used as a straw, may be a tube subjected to secondary processing for formation of a stopper portion, formation of a bellows portion or the like, or may be a tube which has not been subjected to secondary processing.

A method for producing the poly(3-hydroxybutyrate) resin tube of the present invention will now be described.

The tube of the present invention can be produced by, for example, melting a poly(3-hydroxybutyrate) resin in an extruder, then extruding the resin from an annular die connected to an outlet of the extruder, introducing the resin into water to solidify the resin, thereby molding the resin into a tubular shape.

In general, poly(3-hydroxybutyrate) resins have a much slower crystallization rate as compared to other crystalline resins such as polypropylene. Thus, the poly(3-hydroxybutyrate) resin tube is easily flattened (i.e. the flatness is apt to increase) under the effect of hydraulic pressure in water for cooling and solidification. In particular, a poly(3-hydroxybutyrate) resin tube having a larger outer diameter and a smaller wall thickness tends to be more markedly flattened under hydraulic pressure. Thus, it is difficult to produce a tube with a small wall thickness, which includes a poly(3-hydroxybutyrate) resin and a cross-sectional shape close to a perfect circle.

In the present invention, for easily molding a tube with a small thickness, which is inhibited from being flattened, it is preferable that in production of the poly(3-hydroxybutyrate) resin tube, the temperature of the annular die be set to a temperature between the melting point peak temperature and the melting point peak end temperature of the poly(3-hydroxybutyrate) resin in differential scanning calorimetry analysis of the poly(3-hydroxybutyrate) resin. When such a condition is employed, the poly(3-hydroxybutyrate) resin is melted to a level which enables molding, some of crystals remain in the molten resin, and accordingly crystal solidification in water after extrusion can be made rapidly proceed, so that it is possible to suppress flattening of the tube under the effect of hydraulic pressure.

In the method for producing a poly(3-hydroxybutyrate) resin tube according to the present invention, the poly(3- hydroxybutyrate) resin used is preferably a poly(3-hydroxybutyrate) resin having a melt viscosity of 10,000 poise or more at 160° C. By using a poly(3-hydroxybutyrate) resin having a high melt viscosity as described above, the effect of hydraulic pressure in water during solidification can be suppressed, and accordingly, flattening of the tube in water can be further suppressed. The melt viscosity is more preferably 11,000 poise or more, still more preferably 12,000 poise or more, even more preferably 13,000 poise or more. The upper limit of the melt viscosity is not particularly limited, and is preferably 30,000 poise or less from the viewpoint of the surface smoothness of the tube and prevention of an increase in pressure of the annular die. The melt viscosity is a value measured for the entire poly(3-hydroxybutyrate) resin contained in the poly(3-hydroxybutyrate) resin tube (the entire resin containing additives when the tube contains additives such as an inorganic filler).

The poly(3-hydroxybutyrate) resin tube of the present invention may contain one or more inorganic fillers such as talc, calcium carbonate, mica, silica and other inorganic fillers as long as the effects of the present invention are not impaired.

The content of the inorganic fillers is not particularly limited, and is preferably 30 parts by weight or less, more preferably 20 parts by weight or less, based on 100 parts by weight of the poly(3-hydroxybutyrate) resin. The lower limit of the content of the inorganic fillers is not particularly limited, and may be 0 parts by weight. Presence of inorganic fillers is preferable because the melt viscosity of the poly (3-hydroxybutyrate) resin increases, and rapid solidification is achieved, so that a tube shape is favorably formed.

EXAMPLES

Hereinafter, the present invention will be described in more detail by way of examples and comparative examples, which do not limit the present invention.
(Resin Raw Material Used)
Resin raw material 1: Kaneka Biodegradable Polymer PHBH (trademark) 151C manufactured by Kaneka Corporation [poly(3-hydroxybutyrate-co-3-hydroxyhexanoate)] (melting point peak temperature: 125° C., melting point peak end temperature: 167° C.)
Resin raw material 2: Kaneka biodegradable polymer PHBH (trademark) X131A manufactured by Kaneka Corporation [poly(3-hydroxybutyrate-co-3-hydroxyhexanoate)]
(Differential Scanning Calorimetry Analysis Evaluation)
In an endothermic curve obtained when an aluminum pan was filled with 4 to 10 mg of a resin sample, and using a differential scanning calorimeter, the resin sample was melted by elevating the temperature at a speed of 10° C./min from 30° C. to 180° C. under nitrogen flow, the temperature at which the amount of absorption of heat was maximum was defined as a melting point peak temperature, and the temperature at which the melting point ended and absorption of heat did not occur was defined as a melting point peak end temperature.
(Method for Measuring Melt Viscosity)
A capillograph (cylinder diameter: 10 mm) heated to 160° C. and provided with an orifice having a diameter of 1 mm, a length of 10 mm and an inlet angle of 45° was filled with 15 g of a resin sample, and preheated for 5 minutes, and a piston was then moved down at a speed of 10 mm/min to extrude the molten resin through the orifice. From the stress applied to the piston at this time, a melt viscosity at a shear rate of 122/s was calculated.

(Evaluation of Shape of Tube)
The maximum and minimum values of the outer diameter at a certain position in the tube were measured with a caliper. A flatness was calculated by dividing a difference between the maximum value and the minimum value by the maximum value.

A wall thickness of the tube was measured at each of arbitrary three points on a cross-section of the tube with a caliper, and an arithmetic mean thickness thereof was calculated.
(Evaluation of Flexibility of Tube)
A 50 mm end part of the tube cut to a length of 250 mm was held, the opposite end part was pressed with a force of 1N using a push gauge, and evaluation was performed on the basis of the following criteria.
Good: the amount of displacement of the end part by flex of the tube is 30 mm or more.
Poor: the amount of displacement of the end part by flex of the tube is less than 30 mm.
(Evaluation of Biodegradability of Tube in Seawater)
6 L of seawater (collected from the port in Takasago City, Hyogo Prefecture) freed of foreign substances using a mesh with an aperture of 80μ, 3 g of ammonium chloride, and 0.6 g of dipotassium phosphate were put into a plastic container in accordance with ASTM D-7081, the tube cut to a length of 2 cm was introduced into the container, and a weight retention ratio after 3 months was calculated. The temperature of seawater was maintained at 23° C.
(Evaluation of Secondary-Processability of Tube)
The tube cut to a length of 30 mm was introduced in a hot air oven set to a predetermined temperature (130° C. or 140° C.) shown in Table 3, and was preheated for 5 minutes. The tube was then taken out from the oven, the tube shape was visually examined, the tube end part was quickly sandwiched with a clip (Binder Clip No. 107 manufactured by LION OFFICE PRODUCTS CORP.) to form a narrow portion, and held for 1 minute without change. Then, the clip was removed, and whether the narrow portion was welded or not was visually examined. Shape retainability and moldability were evaluated on the basis of the following criteria.
(Shape Retainability)
Good: the initial tube shape is maintained even after preheating.
Poor: the tube shape is deformed by preheating.
(Moldability)
Good: the narrow portion is welded 1 minute after the tube is sandwiched with a clip.
Poor: the narrow portion is not welded 1 minute after the tube is sandwiched with a clip.
[Production of Poly(3-Hydroxybutyrate) Resin Pellet]
The resin raw material 1 and the resin raw material 2 were mixed at a combination ratio as shown in Table 1, 1 part by weight of pentaerythritol was combined with a total of 100 parts by weight of both the resin raw materials in total and the mixture was dry-blended. The obtained resin material was introduced into a φ26 mm unidirectional twin-screw extruder with a cylinder temperature set to 190° C. and a die temperature set to 150° C., extruded, and caused to pass through a water tank filled with hot water at 45° C., thereby solidifying the resin material into a strand. The strand was cut with a pelletizer to obtain resin pellets 1 to 3.

In addition, similarly to above, the obtained resin material was introduced into the twin-screw extruder with a cylinder temperature and a die temperature each set to 150° C., extruded, and caused to pass through a water tank filled with hot water at 45° C., thereby solidifying the resin material into a strand. The strand was cut with a pelletizer to obtain a resin pellet 4.

Table 1 shows the production conditions and the melting point properties of the resin pellets.

TABLE 1

| | Combination | | | Melting point property | | | |
|---|---|---|---|---|---|---|---|
| | Resin raw material 1 (parts by weight) | Resin raw material 2 (parts by weight) | Cylinder temperature (° C.) | Peak temperature (° C.) | End temperature (° C.) | Difference between peak temperature and end temperature (° C.) | Melt viscosity (poise) |
| Resin pellet 1 | 0 | 100 | 190 | 142 | 150 | 8 | 8,100 |
| Resin pellet 2 | 25 | 75 | 190 | 141 | 161 | 20 | 8,700 |
| Resin pellet 3 | 50 | 50 | 190 | 139 | 165 | 26 | 8,800 |
| Resin pellet 4 | 50 | 50 | 150 | 137 | 165 | 28 | 13,900 |

Example 1

The cylinder temperature and the die temperature of a φ12 mm single-screw extruder to which an annular die (outer diameter: 3 mm) is connected were each set to 145° C., the resin pellet 1 was introduced into the extruder, extruded in a tubular form, and caused to pass through a water bath at 30° C. which was located 30 mm away from the annular die, thereby obtaining a tube having an outer diameter of 3 mm and a wall thickness of 0.2 mm. The obtained tube had a perfect-circle cross-section with substantially no difference between the maximum outer diameter value and the minimum outer diameter value. Table 2 shows evaluation results.

Example 2

Except that the resin pellet used for processing was changed to the resin pellet 2, the same procedure as in Example 1 was carried out to obtain a tube. Table 2 shows evaluation results for the obtained tubes.

Example 3

Except that the resin pellet used for processing was changed to the resin pellet 3, and the cylinder temperature and the die temperature were each set to 140° C., the same procedure as in Example 1 was carried out to obtain a tube. Table 2 shows evaluation results for the obtained tubes.

Comparative Example 1

Except that the resin raw material used for processing was changed to polylactic acid (Ingeo 10361D manufactured by NatureWorks LLC), and the cylinder temperature and the die temperature were each set to 160° C., the same procedure as in Example 1 was carried out to obtain a tube. Table 2 shows evaluation results for the obtained tubes.

Since the tubes of Examples 1 to 3 are not flattened, have a perfect-circular cross section, and are rated good for flexibility evaluation, the tubes are hardly broken, and can be safely used as straws. On the other hand, the tube of Comparative Example 1, which is formed from polylactic acid, is rated poor for flexibility evaluation, and is easily broken. The tubes of Examples 1 to 3 are biodegraded in seawater, whereas the tube of Comparative Example 1 is not biodegraded at all in seawater.

Example 4

The cylinder temperature and the die temperature of a φ40 mm single-screw extruder to which an annular die (outer diameter: 11 mm) is connected were each set to 160° C., the resin pellet 3 was introduced into the extruder, extruded in a tubular form, and caused to pass through a water bath located 50 mm away from the annular die, thereby obtaining a tube having an outer diameter of 6 mm and a wall thickness of 0.5 mm. The obtained tube had slight flatness under the effect of hydraulic pressure in the water bath, and it was difficult to further thin the tube with this outer diameter. Table 2 shows evaluation results.

Comparative Example 2

Except that the screw rotation speed of the single-screw extruder was adjusted to set the wall thickness of the tube to 0.7 mm, the same procedure as in Example 4 was carried out to obtain a tube having an outer diameter of 6.3 mm. Table 2 shows evaluation results for the obtained tubes.

Example 5

Except that the resin pellet used for processing was changed to the resin pellet 4, the same procedure as in

TABLE 2

| | | Tube shape | | | | | Degradability in seawater |
|---|---|---|---|---|---|---|---|
| | Resin pellet | Maximum outer diameter value (mm) | Minimum outer diameter value (mm) | Flatness (%) | Wall thickness (mm) | Flexibility | Weight retainability (%) |
| Example 1 | Resin pellet 1 | 3.0 | 2.9 | 3 | 0.2 | Good | 0 |
| Example 2 | Resin pellet 2 | 3.0 | 2.9 | 3 | 0.2 | Good | 0 |
| Example 3 | Resin pellet 3 | 3.0 | 3.0 | 0 | 0.2 | Good | 0 |
| Example 4 | Resin pellet 3 | 6.5 | 6.0 | 8 | 0.5 | Good | 27 |
| Example 5 | Resin pellet 4 | 6.3 | 6.1 | 3 | 0.3 | Good | 0 |
| Comparative Example 1 | PLA | 3.0 | 3.0 | 0 | 0.2 | Poor | 100 |
| Comparative Example 2 | Resin pellet 3 | 6.3 | 6.2 | 2 | 0.7 | Poor | 65 |

Example 4 was carried out to obtain a tube having an outer diameter of 6 mm and a wall thickness of 0.3 mm. Table 2 shows evaluation results.

The tube of Example 4 had a slightly larger flatness because its outer diameter was increased, but the tube was determined to be usable as a straw. The tube has a relatively large wall thickness of 0.5 mm, but is biodegradable in seawater. The tube is rated good for flexibility evaluation, and is hardly broken when used as a straw. On the other hand, the tube of Comparative Example 2 has a low flatness and a good shape, but has a large wall thickness of 0.7 mm, and therefore is not sufficiently biodegradable in seawater. In addition, the tube is rated poor for flexibility evaluation, and is easily broken.

The tube of Example 5 included a resin having a high melt viscosity, and therefore it was possible to reduce the flatness even when the tube was thinned with a large outer diameter.

Comparison of Examples 1 to 5 with Comparative Example 2 shows that a poly(3-hydroxybutyrate) resin tube having a larger wall thickness is biodegraded at a lower rate in seawater.

For the tubes of Examples 1 to 3, further the secondary-processability was evaluated. Table 3 shows evaluation results thereof.

TABLE 3

| | Tube material | | | Secondary-processability | | | |
| | | | | 130° C. | | 140° C. | |
| | Resin pellet | Peak temperature (° C.) | End temperature (° C.) | Difference between peak temperature and end temperature (° C.) | Shape retainability | Moldability | Shape retainability | Moldability |
| --- | --- | --- | --- | --- | --- | --- | --- | --- |
| Example 1 | Resin pellet 1 | 142 | 150 | 8 | Good | Poor | Poor | Good |
| Example 2 | Resin pellet 2 | 141 | 161 | 20 | Good | Good | Good | Good |
| Example 3 | Resin pellet 3 | 139 | 165 | 26 | Good | Good | Good | Good |

The tube of Example 1 in which the difference between the melting point peak temperature and the melting point peak end temperature of the resin raw material used was lower than 10° C. had had poor moldability after preheating while having good shape retainability during preheating at a preheating temperature of 130° C., and had poor shape retainability during preheating while having good moldability after preheating at a preheating temperature of 140° C.

This shows that the tube of Example 1 did not have both good shape retainability during preheating and good moldability after preheating at any of preheating temperatures of 130° C. and 140° C. On the other hand, the tubes of Examples 2 and 3 in which the temperature difference is 10° C. or higher each have both good shape retainability during preheating and good moldability after preheating at any of preheating temperatures of 130° C. and 140° C., and are excellent in secondary-processability.

The invention claimed is:

1. A method for producing a poly(3-hydroxybutyrate) resin tube comprising a poly(3-hydroxybutyrate) resin, the method comprising:
   mixing at least two types of poly(3-hydroxybutyrate) resins to obtain the poly(3-hydroxybutyrate) resin;
   melting the obtained poly(3-hydroxybutyrate) resin in an extruder;
   extruding the melted poly(3-hydroxybutyrate) resin from an annular die; and
   introducing the extruded poly(3-hydroxybutyrate) resin into water,
   wherein a temperature of the annular die is set to be between a melting point peak temperature and a melting point peak end temperature in differential scanning calorimetry analysis of the poly(3-hydroxybutyrate) resin,
   wherein the tube has a wall thickness of from 0.1 to 0.6 mm, and
   wherein a difference between a melting point peak temperature and a melting point peak end temperature in differential scanning calorimetry analysis of the poly(3-hydroxybutyrate) resin is from 10° C. to 30° C.

2. The method according to claim 1, wherein the poly(3-hydroxybutyrate) resin has a melt viscosity at 160° C. of at least 10,000 poise.

3. The method according to claim 1, wherein the poly(3-hydroxybutyrate) resin is poly(3-hydroxybutyrate-co-3-hydroxyhexanoate).

4. The method according to claim 1, wherein the difference between the melting point peak temperature and the melting point peak end temperature in differential scanning calorimetry analysis of the poly(3-hydroxybutyrate) resin is from 12° C. to 30° C.

5. The method according to claim 1, wherein the difference between the melting point peak temperature and the melting point peak end temperature in differential scanning calorimetry analysis of the poly(3-hydroxybutyrate) resin is from 15° C. to 30° C.

6. The method according to claim 1, wherein during the melting and extruding, the poly(3-hydroxybutyrate) resin is melted to a level which enables molding, and crystals of the poly(3-hydroxybutyrate) resin remain in the melted poly(3-hydroxybutyrate) resin.

7. The method according to claim 1, which further comprising subjecting the poly(3-hydroxybutyrate) resin tube to a secondary processing.

\* \* \* \* \*